United States Patent [19]
Duncan

[11] Patent Number: 5,138,150
[45] Date of Patent: Aug. 11, 1992

[54] PHOTOELECTRIC PROXIMITY SENSOR HAVING SHUTTER ADJUSTMENT MEANS FOR SENSING REGION DISTANCE

[75] Inventor: Eugene F. Duncan, Wauwatosa, Wis.

[73] Assignee: Eaton Corporation, Cleveland, Ohio

[21] Appl. No.: 627,520

[22] Filed: Dec. 14, 1990

[51] Int. Cl.$^5$ .............................................. G01V 9/04
[52] U.S. Cl. ................................. 250/221; 250/222.1; 340/556
[58] Field of Search ............... 250/221, 222.1, 237 R; 340/555, 556, 557

[56] References Cited

U.S. PATENT DOCUMENTS

| 178,391 | 6/1976 | Wale. | |
|---|---|---|---|
| 3,447,862 | 6/1969 | Elpern | 350/269 |
| 3,715,149 | 2/1973 | Freeland | 350/58 |
| 3,843,267 | 10/1974 | Vital et al. | 356/225 |
| 4,282,430 | 8/1981 | Hatten et al. | 250/221 |
| 4,306,147 | 12/1981 | Fukuyama et al. | 250/221 |
| 4,778,254 | 10/1988 | Gilliland, III et al. | 350/269 |

Primary Examiner—David C. Nelms
Assistant Examiner—S. Allen
Attorney, Agent, or Firm—L. G. Vande Zande

[57] ABSTRACT

A shutter is manually rotated across a circular aperture and into a light beam projecting through said aperture to selectively block a predetermined proportion of the light beam, thereby reducing intensity of light emitted to shorten the target sensing region distance for a photoelectric proximity sensor. First and second edges of the shutter intersect at a corner common to both edges and greater than ninety degrees. The shutter pivot is located so the corner traverses the aperture and thus the light beam substantially diametrically to cause the first edge to progressively reduce the light beam, the second edge sequentially progressively reducing the remaining half-circle of light beam upon continued rotation of the shutter.

6 Claims, 3 Drawing Sheets

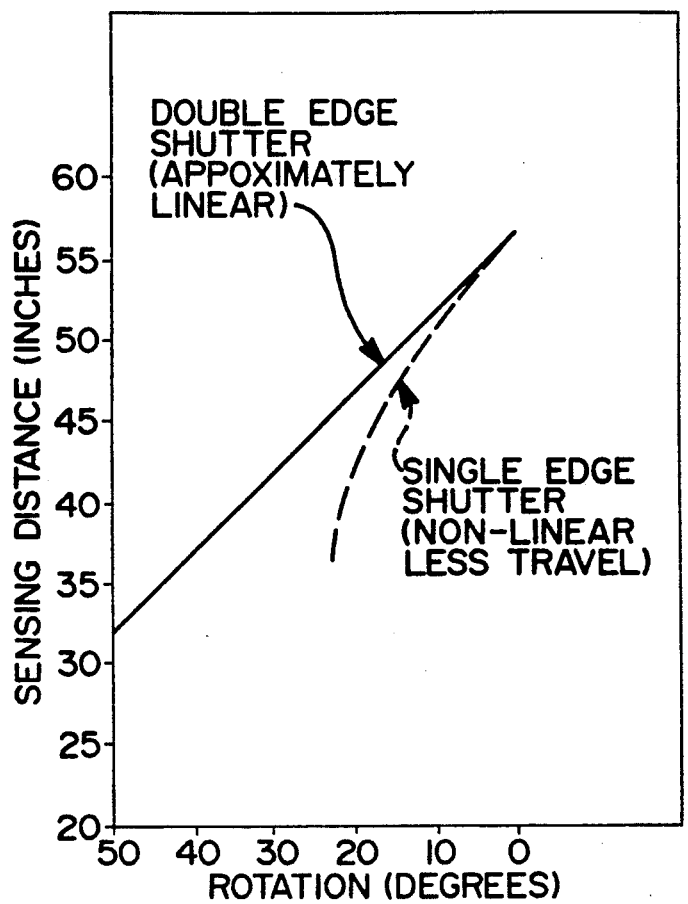
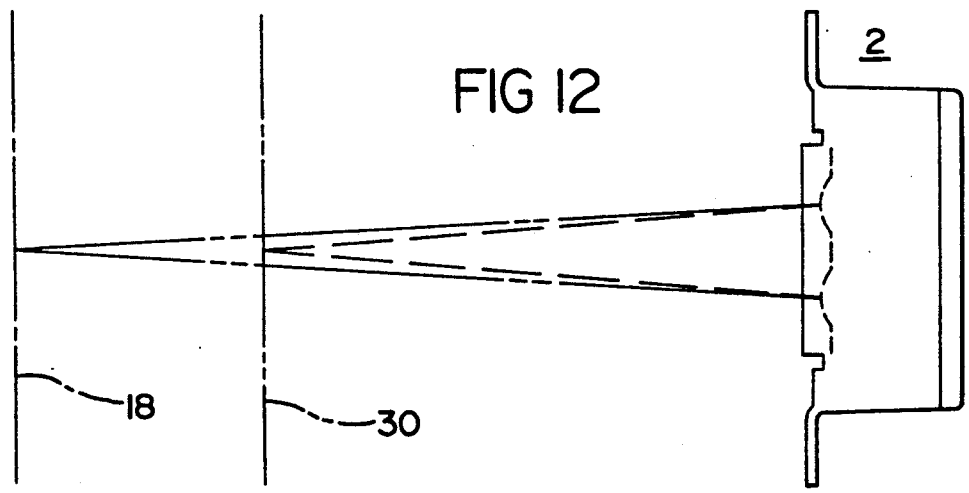
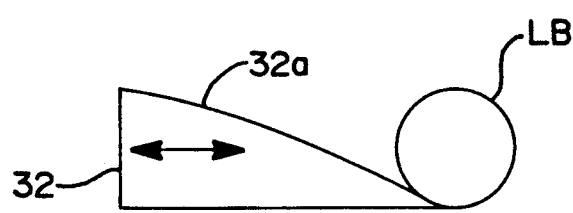

PHOTOELECTRIC PROXIMITY SENSOR HAVING SHUTTER ADJUSTMENT MEANS FOR SENSING REGION DISTANCE

BACKGROUND OF THE INVENTION

This invention relates to photoelectric sensors and more particularly to photoelectric reflective sensors used as proximity sensors, i.e. for detecting the presence of an object in a sensing region. Sensors of this type are referred to as diffuse reflective sensors inasmuch as they do not require a specially reflective surface to reflect a beam of light, but reflect diffuse light off an ordinary surface of an object to be detected.

Diffuse reflective photoelectric sensors have a light emitting element directing a beam of light out to or toward a sensing region. They also have a light detecting element such as a phototransistor or a photodiode similarly directed toward the sensing region. Lenses may be used to focus the beam of light. The light detecting element operates to provide an electric output signal when light of a predetermined intensity is received by that element. This occurs when a target object is present at a predetermined distance from the sensor whereby the beam of light from the emitting element is reflected from the target object back to the detecting element with sufficient intensity to operate the detecting element. It is necessary to provide adjustment of the sensing distance in order for such sensors to be practicably usable in industrial environments. Such adjustment may be accomplished mechanically wherein the light emitting element and the light detecting element are aimed along intersecting lines and one or both of such elements are mechanically pivotably adjustable to increase or decrease the angle of intersection, thereby shortening or lengthening the distance of the target sensing region, respectively. Another means of increasing or decreasing the target distance from the sensor is to adjust the electronics such as by adjusting a gain potentiometer while monitoring the output when the sensor is aimed at the target at the desired distance. This adjustment is difficult to make when the sensor incorporates a timed output. Moreover, access to such potentiometers usually requires a hole through the housing, which hole needs to be covered or plugged after the adjustment for applications of the sensor.

SUMMARY OF THE INVENTION

This invention provides an improved means and method of adjusting the sensing distance of a photoelectric proximity sensor. The adjusting means of this invention is readily and economically incorporated in a photoelectric proximity sensor, is easy to use and directly relates an increment of adjustment movement to a linear adjustment in distance. This invention provides a mechanical shutter which is adjustably inserted into the light path of the sensor to selectively block a predetermined proportion of the light from the detecting element of the sensor, thereby reducing the light intensity seen by the detecting element, and thereby decreasing the sensing distance for the sensor. Linear adjustment of the sensing distance is accomplished by provision of a profile on the shutter which cooperates with the cross sectional shape of the light beam to provide the desired linear response. The invention, its features and advantages, will become more apparent when reading the following description and claims in conjunction with the accompanying drawings.

BRIEF DESCRIPTION OF THE DRAWINGS

FIG. 11 is a graph relating distance of the sensing region from the sensor to adjustment of the shutter;

FIG. 12 is a schematic representation of the photoelectric proximity sensor of this invention and different sensing regions achieved by the adjustment means of this invention; and FIG. 13 is a schematic view of an alternative shutter embodiment for the adjustment means of this invention.

DETAILED DESCRIPTION OF THE PREFERRED EMBODIMENT

Figure 1:
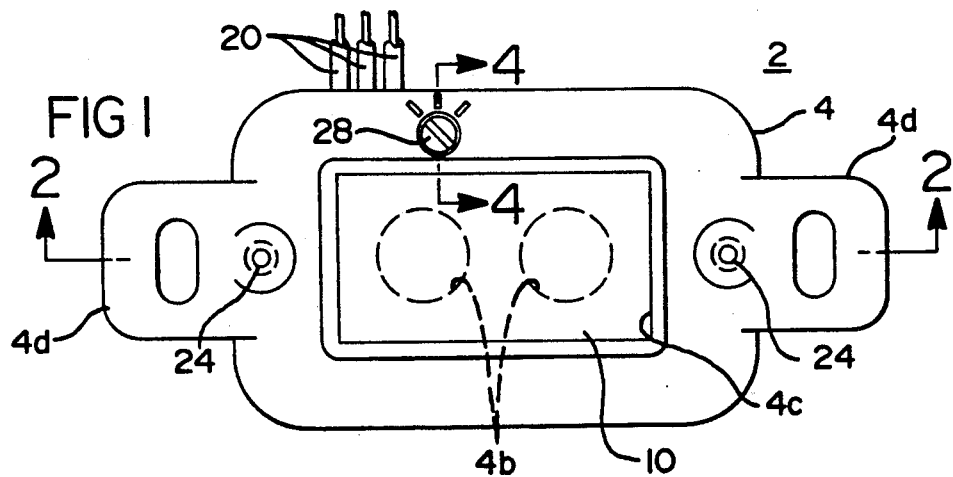
FIG. 1 is a front plan view of the photoelectric proximity sensor of this invention.

The photoelectric proximity sensor of this invention is shown generally at 2 in the drawings. The sensor 2 has a molded insulating housing comprising a case 4 and a cover 6 which are secured together by ultrasonic welding or the like after internal parts have been assembled. Case 4 has a central rearwardly projecting interior wall 4a which divides the case into two substantially identical chambers. The front wall of case 4 is provided with a generally circular aperture 4b in each of the chambers. A transparent plastic lens 8 is positioned in each aperture 4b by suitable means which are shown in the drawing to be snap-in retention means molded into the case 4, although such means do not constitute a part of this invention. The exterior side of the front wall of case 4 is provided with a rectangular recess 4c which encompasses both of the circular apertures 4b. A rectangular lens filter 10 is secured in recess 4c over the lenses 8 by ultrasonic welding or the like.

The back side of case 4 is open to receive a circuit board 12. Case 4 is provided with various internal ledges and projections to position circuit board 12 across open back thereof. Cover 6 similarly has forwardly extending projections such as 6a (FIG. 2) at the corners to engage the rear surface of circuit board 12 and hold it firmly in place within case 4. The front surface of circuit board 12 carries the light emitting and light detecting elements of the sensor such as light emitting diode 14 and photodiode or phototransistor 16, respectively. Light emitting diode (LED) 14 is located in the left-hand chamber of case 4 as viewed in the drawing substantially axially aligned with the respective lens 8. Similarly, photodiode or phototransistor 16 is located in the right-hand chamber of case 4 substantially axially aligned with the respective lens 8. A light beam LB emitted from LED 14 is focused by the associated lens 8 and projected through the respective aperture 4b and associated lens 8 to a target sensing region such as represented by the dot-dash line 18 in FIG. 12. If a target object is present within the distance represented by line 18, diffuse light will be reflected from the target and received through the appropriate aperture 4b in the right-hand chamber of case 4, focused by the lens 8 to be received on the photodiode/phototransistor 16. When light so received is of a predetermined intensity, photodiode/phototransistor 16 will operate to produce an electrical output signal to the electronic circuit on circuit board 12 which in turn produces an output signal through the respective wire leads 20 (FIG. 1).

As may be recognized from the profile of the sensor 2, particularly the mounting tabs 4d which extend outwardly at the ends of case 4, and the screws 22 captivated within openings in the mounting tabs, the sensor is designed to be used in a standard switch box. The front surface of case 4 is also provided with a pair of internally threaded inserts 24 for receiving screws (not shown) for mounting an escutcheon over the sensor, switch box and wall opening.

The sensor 2 of this invention is particularly suited for detecting the presence of an individual at a particular location and by operating, in a timed manner, upon such detection or upon the departure of the individual from the sensing region. By way of example, a particular application of such sensor is as a flush control for a urinal in a public rest room. The sensor is set to detect the presence of a person standing in position before a urinal and to operate a timed interval after departure of the individual from the sensing region to operate a solenoid controlled flush valve. To prevent operation of the solenoid by detection of background objects as opposed to an individual in the sensing region, the sensor is adjustable to lengthen or shorten the distance of the sensing region from the sensor. Sensors of this type are commonly installed by members of the building trades and the like, such as electricians. Accordingly, the adjustment means should not require the undue use of instrumentation and should be simple, straightforward, and suitably marked or indicated to relate movement of the adjustment means directly to movement of the sensing distance. Moreover, the adjustment means should be inexpensive.

Figure 2:
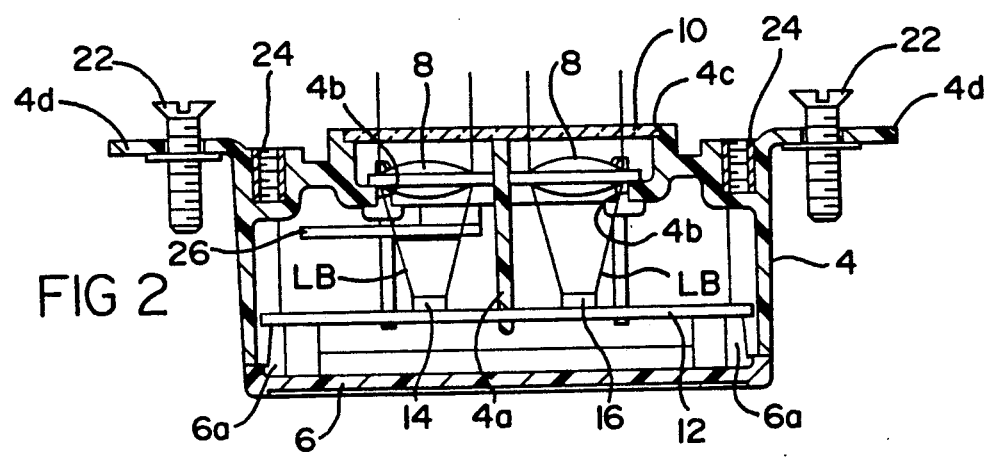
FIG. 2 is a cross sectional view taken along the line 2—2 of the photoelectric proximity sensor of FIG. 1.
Figure 3:
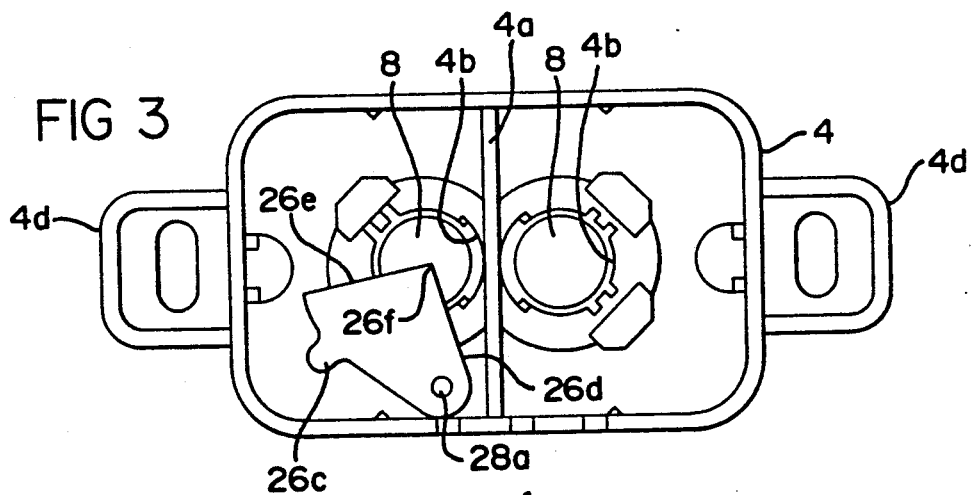
FIG. 3 is a rear view of the case assembly of the photoelectric proximity sensor of this invention showing an adjustment shutter according to this invention.
Figure 4:
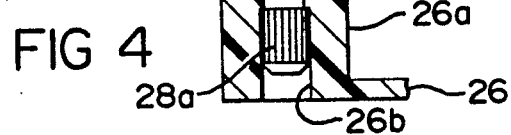
FIG. 4 is a cross sectional view of the adjustment shutter of this invention taken along the line 4—4 in FIG. 1 and drawn to an enlarged scale.

The adjustment means of this invention comprises a shutter 26 shown particularly in FIGS. 2 and 3 as being pivotally mounted in the left-hand chamber of case 4. Shutter 26 comprises a planar, somewhat pie shaped member having a hub portion 26a at one end, the hub having a hole 26b (FIG. 4) extending therethrough. As best seen in FIG. 4, the front wall of case 4 has a shouldered opening 4e extending therethrough. A headed screw-like insert 28 having a knurled or splined shaft 28a is inserted through opening 4e and press fit into the opening 26b of shutter 26 such that the shutter is rigidly mounted to the shaft, 28a and pivotally mounted by the member 28 to the case 4. By engaging the slot in the external headed end of member 28 with a tool such as a screwdriver or the like, the shutter 26 can be rotated across the aperture 4b and lens 8 in the left-hand chamber of case 4. As seen in FIG. 1, the exterior surface of case 4 and the surface of member 28 may be provided with markings to indicate the position of shutter 26 from the exterior of sensor 2. A projection 26c extends from one side of shutter 26 to function as a stop for the shutter in one direction of pivotal rotation as seen in FIG. 3. The opposite side 26d of shutter 26 functions as a stop in the other rotational direction when it engages the center wall 4a. The distal end of shutter 26 comprises a side 26e which emanates from side 26d at greater than a right angle at a corner 26f.

Figure 5:
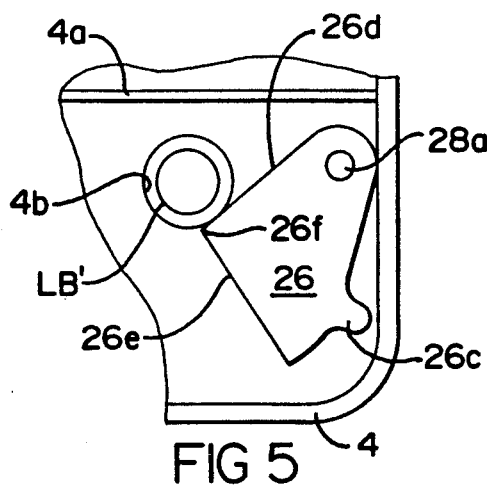
FIGS. 5-10 are sequential schematic views showing progressive positions of the adjustment shutter with respect to the cross section of the light beam.
Figure 6:
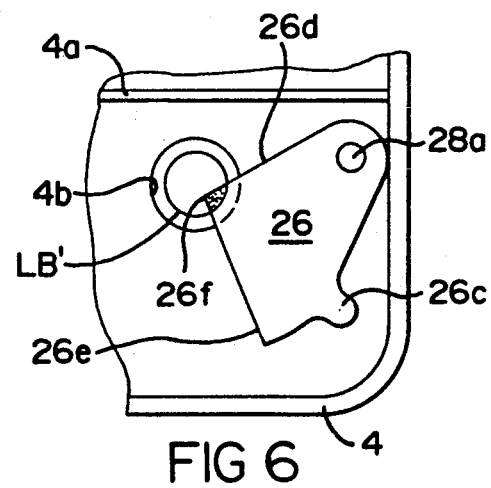
Figure 7:
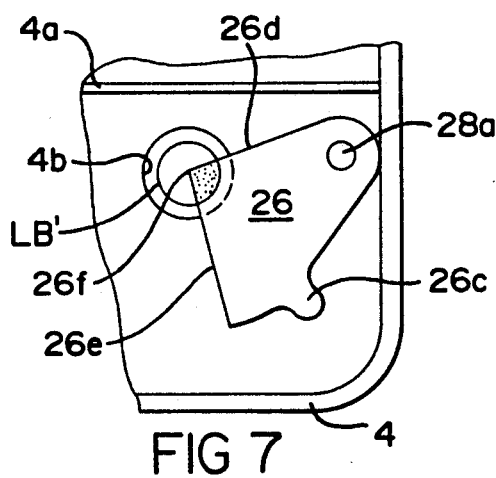
Figure 8:
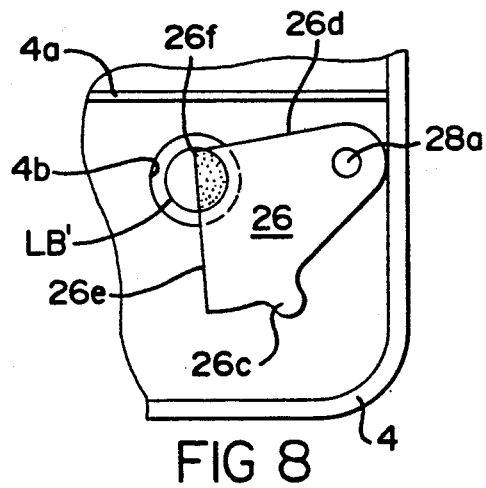
Figure 9:
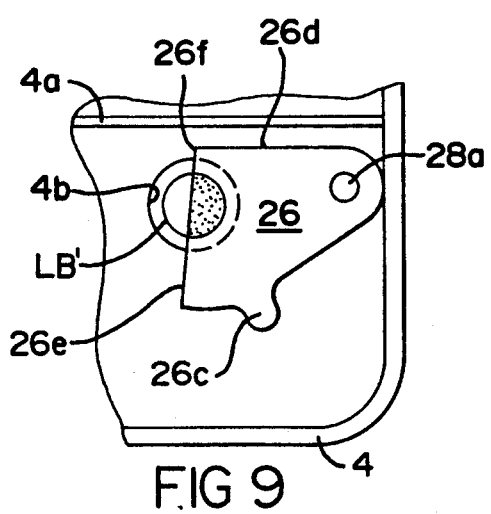
Figure 10:
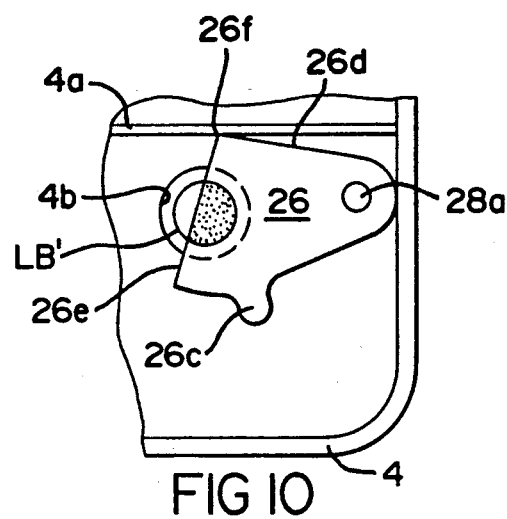

Referring to FIGS. 5-10, it may be seen that shutter 26 is pivotally moved into light beam LB and across aperture 4b from a fully open position shown in FIG. 5 to a substantially closed position shown in FIG. 10. It will be seen in the sequential intermediate FIGS. 6-9 that the corner 26f traverses an arcuate line across the aperture 4b which is nearly diametrical, passing slightly beyond the center axis of the opening. By moving across the aperture 4b, shutter 26 moves into the light beam LB emitted from LED 14. The light rays constituting light beam LB which radiate to the outer edges of aperture 4b form a conical shape. Inasmuch as the shutter 26 is disposed between LED 14 and the aperture 4b, the conical shape of the light beam LB renders the diameter of the cross section of light beam LB on the surface of shutter 26 smaller than at the aperture 4b or at the curved portion of lens 8 as represented by the concentric circles LB' and 4b in FIGS. 5-10. It will be seen that as the corner 26f diametrically traverses the entire light beam LB' to reduce the area of the light beam projecting through lens 8 and aperture 4b, that continued movement of the shutter 26 will cause angled side 26e to reduce the remaining half-circle of the light beam LB. The profile afforded by the conjunctive sides 26d and 26e and their included obtuse angle at the corner 26f provides a linear change in distance of the sensing region from the sensor in direct relation to movement of the shutter. The sides 26d and 26e become sequentially effective as the shutter traverses the light beam and aperture. By decreasing the amount of light emitted by LED 14 through the associated lens 8 and aperture 4b, the intensity of the light received by sensor 2 is reduced. This reduction in light intensity effectively shortens the distance between the sensing region and the sensor 2 as indicted by the double dot-dash line 30 in FIG. 12.

The adjustment means for the distance of the sensing region for the photoelectric proximity sensor as described hereinbefore provides a simple and economical direct adjustment which translates to a linear distance adjustment in direct relation to movement of the shutter. Although the shutter has been shown in the best mode contemplated for practicing the invention at this time, it is to be recognized that it is susceptible of various modifications without departing from the scope of the appended claims. For example, the rotary shutter 26 could be replaced by a linearly movable shutter such as shown schematically at 32 in FIG. 13. The profile for this shutter would be the curved edge 32a shaped to provide, cooperatively with the circular shape of the light beam LB", the desired linear variation in sensing distance.

I claim:

1. A photoelectric proximity sensor for detecting presence of an object in a sensing region comprising:
   a housing having an internal cavity and first, second and third apertures extending through said housing communicating with said cavity;
   a light emitting element stationarily mounted in said cavity emitting a generally conical light beam directed through said first aperture toward said sensing region;
   a lighting detecting element stationarily mounted in said cavity for receiving light through said second aperture from said emitting element reflected by an object in said sensing region, said detecting element providing an electrical output signal in response to light of predetermined intensity impinging said detecting element; and adjusting means for linearly varying the distance said sensing region is spaced from said sensor in correspondence to incremental movement of said adjusting means, said adjusting means comprising a shutter disposed adjacent said first aperture within said cavity, said shutter being mounted directly on a shaft rotatably mounted in said third aperture, said shutter having a profile variably pivotally inserted into said emitted light beam by movement of said shaft to block a selectively predetermined proportion of said emitted light, thereby varying intensity of said light received by said detecting element and varying said distance, incremental movement of said shaft and shutter producing a corresponding linear variation of said distance.

2. The photoelectric proximity detector defined in claim 1 wherein said shutter profile comprises first and second substantially straight edges joined at a common corner, said first edge being a leading edge as said shutter is moved into said light beam and said second edge defining a distal end of said shutter, said corner moving along a path substantially bisecting a circular cross section of said generally conical light beam.

3. The photoelectric proximity detector defined in claim 2 wherein said first and second edges define an included angle at said corner greater than ninety degrees, said second edge becoming effective to progressively block said light beam during continued movement of said shutter subsequent to said first edge traversing said light beam.

4. The photoelectric proximity detector defined in claim 3 wherein said shaft and said third aperture comprise annular shoulders mutually engaged to provide sealing around said shaft.

5. A method of linearly adjusting the distance between a photoelectric proximity sensor and a sensing region thereof comprising:

providing a sensor housing having an internal cavity and first, second and third apertures extending through said housing communicating with said cavity;

fixing a light emitting element within said cavity and directing a generally conical light beam emitted from said emitting element through said first aperture toward said sensing region;

fixing a light detecting element within said cavity in alignment with said second aperture and directing said detecting element for receiving light from said emitting element reflected from an object in said sensing region through said second aperture;

pivotally supporting a shutter within said cavity adjacent said first aperture on a shaft rotatably mounted in said third aperture and directly connected to said shutter;

providing a profile comprising first and second substantially straight edges joined at a common corner on said shutter; and rotating said shaft for pivoting said corner substantially through a center of a circular cross-section of said light beam, selectively blocking a predetermined proportion of said emitted light and thereby varying the intensity of said light received by said detecting element to linearly vary said distance in correspondence with incremental movement of said shaft and shutter.

6. The method of adjusting the distance between a photoelectric proximity sensor and a sensing region thereof defined in claim 5 further comprising the step of disposing said first and second edges at an angle greater than ninety degrees, whereby said first edge progressively blocks light in a first half of said circular shape during movement of said shutter across said light beam and continued movement of said shutter causes said second edge to progressively block light in a remaining one-half of said circular shape of said light beam.

* * * * *